(12) United States Patent
Lee et al.

(10) Patent No.: US 9,788,040 B2
(45) Date of Patent: Oct. 10, 2017

(54) FILE PLAYBACK METHOD AND APPARATUS

(71) Applicant: Samsung Electronics Co., Ltd., Gyeonggi-do (KR)

(72) Inventors: Haedong Lee, Daegu (KR); Eunyeung Lee, Gyeongsangbuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 14/530,547

(22) Filed: Oct. 31, 2014

(65) Prior Publication Data
US 2015/0127779 A1    May 7, 2015

(30) Foreign Application Priority Data
Nov. 1, 2013    (KR) .......................... 10-2013-0132011

(51) Int. Cl.
*G06F 15/16*     (2006.01)
*H04N 21/41*     (2011.01)
*H04L 29/06*     (2006.01)
*H04N 21/436*    (2011.01)
*H04N 21/4402*   (2011.01)

(52) U.S. Cl.
CPC ..... *H04N 21/4122* (2013.01); *H04L 65/4084* (2013.01); *H04N 21/4126* (2013.01); *H04N 21/43615* (2013.01); *H04N 21/440263* (2013.01)

(58) Field of Classification Search
CPC . H04N 21/4316; H04N 21/8549; H04W 4/18; H04W 88/06
USPC .................................................. 709/219, 203
See application file for complete search history.

(56) References Cited

U.S. PATENT DOCUMENTS

| | | | |
|---|---|---|---|
| 8,438,297 B1 * | 5/2013 | Chen | H04L 29/00 709/203 |
| 8,799,253 B2 * | 8/2014 | Valliani | G06F 17/30781 707/706 |
| 8,875,184 B1 * | 10/2014 | Bakare | G06F 17/30867 725/41 |
| 2001/0030660 A1 | 10/2001 | Zainoulline | |
| 2002/0080159 A1 | 6/2002 | Montgomery et al. | |
| 2003/0110515 A1 * | 6/2003 | Satoda | H04N 21/23418 725/135 |

(Continued)

FOREIGN PATENT DOCUMENTS

EP    1507390 A1    2/2005

*Primary Examiner* — Duyen Doan

(57) ABSTRACT

A method for playing multimedia data in an electronic device includes A method for playing multimedia data in an electronic device, the method comprising: receiving a request for transmitting a file including multimedia data to a second device; identifying sample playback data that is a portion of multimedia data; transmitting the identified sample playback data; and transmitting the multimedia data of the file to the second device after transmitting the sample playback data. An electronic device includes a radio frequency unit configured to transmit or receive a signal, and a processor configured to receive a sample playback data that is a part of the multimedia data of a file via the radio frequency unit, and play the received sample playback data of the multimedia data while receiving the file from the external device. Other embodiments are also disclosed.

17 Claims, 13 Drawing Sheets

(56) References Cited

U.S. PATENT DOCUMENTS

| | | | |
|---|---|---|---|
| 2003/0236714 A1 | 12/2003 | Kageyama | |
| 2004/0128324 A1* | 7/2004 | Sheynman | G06F 21/10 |
| 2005/0004997 A1* | 1/2005 | Balcisoy | H04N 21/23406 |
| | | | 709/219 |
| 2005/0068876 A1 | 3/2005 | Tanaka et al. | |
| 2005/0086488 A1 | 4/2005 | Kori et al. | |
| 2005/0160089 A1 | 7/2005 | Fujita et al. | |
| 2005/0246375 A1* | 11/2005 | Manders | G06F 17/30053 |
| 2008/0248740 A1* | 10/2008 | Lazovsky | G06Q 30/06 |
| | | | 455/3.01 |
| 2009/0165062 A1* | 6/2009 | Harris | H04N 7/17318 |
| | | | 725/87 |
| 2010/0242066 A1* | 9/2010 | Tseng | H04N 7/17327 |
| | | | 725/38 |
| 2012/0001724 A1* | 1/2012 | Belimpasakis | H04L 29/06 |
| | | | 340/5.1 |
| 2012/0064870 A1 | 3/2012 | Chen et al. | |
| 2014/0215517 A1* | 7/2014 | Kuo | H04N 21/4622 |
| | | | 725/41 |

\* cited by examiner

FILE PLAYBACK METHOD AND APPARATUS

CROSS-REFERENCE TO RELATED APPLICATION AND CLAIM OF PRIORITY

The present application is related to and claims the benefit under 35 U.S.C. §119(a) of a Korean patent application filed on Nov. 1, 2013 in the Korean Intellectual Property Office and assigned Serial No. 10-2013-0132011, the entire disclosure of which is hereby incorporated by reference.

TECHNICAL FIELD

The present invention relates to a file playback method and apparatus and, in particular, to a method and apparatus for pre-playing a part of the file to be transferred by an electronic device.

BACKGROUND

With the rapid popularization of electronic devices, the electronic devices are becoming one of the essentials of life. Mobile terminal is a representative example of the electronic device. The mobile terminal has been evolved to the electronic device capable of playing multimedia data including video and audio data as well as providing legacy voice telephony service and data transfer service.

Also, there are various methods developed for multiple users having their own mobile terminals to transfer multimedia files to external electronic devices. Also, there are various methods developed for one user to share files among two or more user's own mobile terminals. As a consequence, there is a tendency that files sharing among the users' own terminals or with other terminals is performed directly rather than through any external web or P2P service.

In the conventional technology, the file exchange among the electronic device is performed with a means selected by the user. The data transfer time varies depending on the transfer means selected by the user and the varying transfer environment. Such dependency on the transfer means and transfer environment makes it difficult for the user to predict the data transfer time.

Although the multimedia file is compressed to be transmitted with a certain compression scheme, the compressed file is also large in size in general due to the nature of the multimedia file. This means that it takes relatively long time to transfer the multimedia file. Particularly when transferring music files by category such as genre, artiest, running time, and periodic ranking, the number and amount of files to be transmitted at a time increases significantly. This means that the transfer time increases in proportion to the number and amount of files.

Typically, it is likely that the user transfers a plurality of files at a time. The plural multimedia files are presented with file names and extensions in the form of a file list. The user has to check the files to be stored or transmitted with eyes and select cumbersomely.

Assuming an exemplary case of intending to share about 50 music files between two electronic devices, the transmit-side user has to select the music files requested by the receive-side user one by one or all the files to send. The receive-part can check the types and contents of the music files after the file transfer has completed but not in the course of transferring. This means that one of the transmit-side and receive-side users has to spent relatively long time to check the list of 50 music files or to select the files to build the list.

If it takes so long time to transfer the files, this means that the user has to wait for the completion of the file transfer. If it is not the user's intention to listen to all the music files, this is a need of an extra task to check the titles of the received music files and register the selected files with a playback list. The waiting time for the completion of the copy transfer is likely to cause significant user inconvenience.

Meanwhile, the user may want to listen to the music files during the transfer. In the conventional method where the user downloads the multimedia file through the web or P2P, it is possible to play the file to the download-complete point immediately in the course of downloading. This means that the user can receive and play the first song simultaneously.

In the case of transferring a plurality files, however, the user cannot pre-listen the next or another file among the files being transferred before the next file is downloaded to some extent after the complete of download of the first file.

This means that it is not possible for the user to pre-play all the files being transferred before the completion of the transfer. Since there is no manager in direct file transfer between terminals for providing the file list or playback service like the web, the user cannot pre-listen all of the songs. There is therefore a need of a pre-playback method and apparatus of an electronic device capable of the above problems.

SUMMARY

A method for playing multimedia data in an electronic device includes receiving a request for transmitting a file including multimedia data to a second device, identifying sample playback data of the file that is a portion of multimedia data, transmitting the identified sample playback data, and transmitting the multimedia data of the file to the second device after transmitting the sample playback data.

In some embodiments, the method further includes, if the received file includes no sample playback data, generating sample playback data, and transmitting the generated sample playback data to the second device.

In some embodiments, the method further includes initiating transmission of the file, and playing the sample playback data of the multimedia data during the transmission of the file simultaneously.

In some embodiments, the method further includes displaying the sample playback data on a screen of the electronic device.

In some embodiments, the multimedia data comprises at least one of audio data, image data, and video data.

In some embodiments, wherein the sample playback data comprises an identifier indicating a format of the multimedia data and playable multimedia data.

In some embodiments, a playback length of the sample playback data is determined, based on a transmission time of the multimedia data, considering a transmission rate.

In some embodiments, the method further includes storing the generated sample playback data in a memory of the electronic device.

A method for playing multimedia in an electronic device includes receiving a sample playback data that is a part of the file including multimedia data from the external device, and playing the received sample playback data while receiving the file from the external device.

An electronic device includes a radio frequency unit configured to transmit or receive a signal, and a processor configured to receive a request to transmit a file including at least one multimedia file to an external device, identify the sample playback data for playing a predetermined part, and transmit the sample playback data.

An electronic device includes a radio frequency unit configured to transmit or receive a signal, and a processor configured to receive a sample playback data that is a part of the multimedia data via the radio frequency unit, and play the sample playback data of the multimedia data while receiving the file from the external device.

An electronic playback device includes a transceiver configured to receive or transmit a signal, a processor configured to receive a file including multimedia data from an external device, determines whether the file includes sample playback data that is a part of the multimedia data, and generate the sample playback data if the multimedia data includes no sample playback data; and play the sample playback data while receiving the multimedia data from the external device.

To address the above-discussed deficiencies, it is a primary object to provide a file pre-playback method of an electronic device is provided. The method includes receiving a file including at least one multimedia data, determining whether the multimedia data includes sample playback data for playing a predetermined part, and transmitting, when the multimedia data includes the sample playback data, the sample playback data.

In accordance with another aspect of the present invention, a file pre-playback method of an electronic device is provided. The method includes receiving a sample playback data as a predetermined playable part of multimedia data, starting receiving a file including the multimedia data, and playing the sample playback data of the multimedia data while receiving the file.

In accordance with still another aspect of the present invention, an electronic playback device is provided. The electronic device includes a control unit which receives a file including multimedia data, determines whether the multimedia data includes sample playback data for playing a predetermined part, and extracts, when the multimedia data includes no sample playback data, the sample playback data and an audio processing unit which plays the extracted sample playback data.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
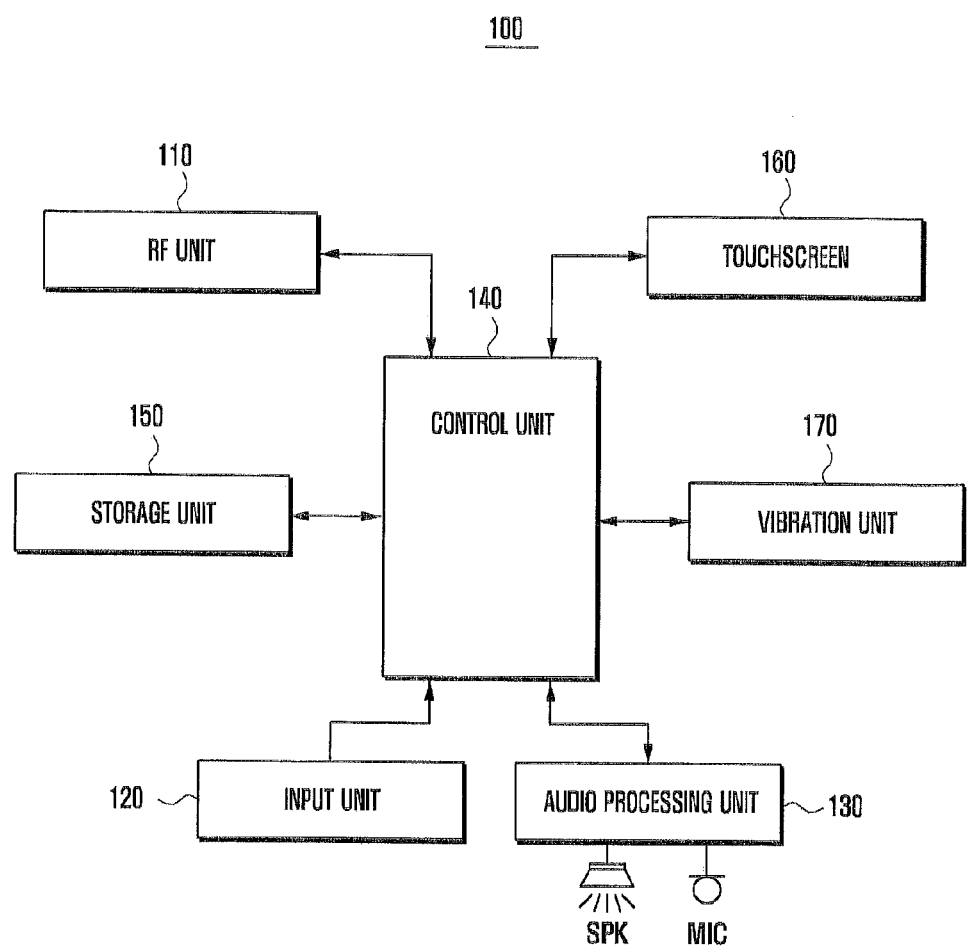
FIG. 1 is a block diagram illustrating a configuration of the mobile terminal according to an embodiment of the present invention.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

The aforementioned technical solution and advantageous effects will be more cleared through the accompanied drawings and specification and thus those skilled in the art can practice the present invention with difficulty. Detailed description of well-known functions and structures incorporated herein may be omitted to avoid obscuring the subject matter of the present invention.

Also, the detailed descriptions of specific embodiment as well as principles and viewpoints of the embodiments have to be construed to include structural and function equivalents. Such equivalents have to be construed to include those known currently and to be developed in the future, i.e. all the devices invented to perform the same functions independently of their structures.

In the specification of the present invention a block diagram should be understood to present the conception viewpoint of the exemplary circuitry embodying the principle of the present invention. Similarly, all the flowcharts, state transition diagrams, and pseudo-codes should be understood to be stored in a computer-readable storage medium and represents various processes executable by a computer or a processor regardless of whether the computer or the processor is depicted explicitly. The functions of the various devices depicted in the drawings including the function block expressed as a processor or a similar concept can be provided with the use of hardware capable of executing software as well as the dedicated hardware. When provided by a processor, the function may be provided by a single dedicated processor, a single shared processor, or a plurality of individual processors, some of which may be shared.

The explicit use of the terms of processor and control and similar concepts thereof should not be construed as exclusive reference for the hardware having the capable of executing the software but including ROM, RAM, and volatile memory for storing digital signal processor (DSP) hardware and software without restriction. Also, other well-known hardware may be included.

In the claims, the components expressed as means for performing the functions described in the specification are intended to include all the method of performing the functions including all the types of software including combinations of circuit devices performing the above functions or firmware/micro codes and combined with the circuits appropriate for executing the software to perform the function. Since the present invention defined by the claims can be implemented by combining the variously enumerated means and meet for the requirements of the claims, all the means capable of providing the above function should be understood as equivalents of the components as enumerated in the specification.

Exemplary embodiments of the present invention are described herein with reference to the accompanying drawings in detail. The terms and words used in this description and the appended claims are not to be interpreted in common or lexical meaning but, based on the principle that an inventor can adequately define the meanings of terms to best describe the invention, to be interpreted in the meaning and concept conforming to the technical concept of the present invention. Thus, it should be understood that there may be various equivalents and modified examples that can replace the embodiments described in the present specification and the configuration shown in the drawings at the time of filling the present application.

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention. This aims to omit unnecessary description so as to make the subject matter of the present invention clear.

For convenience of explanation, the description is made with a mobile terminal 100 as an example of the electronic device. However, the following embodiments of the present invention are not limited to the mobile terminal 100.

FIG. 1 is a block diagram illustrating a configuration of the mobile terminal according to an embodiment of the present invention. The mobile terminal 100 includes a Radio Frequency (RF) unit 110, an input unit 120, an audio processing unit 130, a touchscreen 140, a storage unit 150, a control unit 160, and a vibration unit 170.

The RF unit 110 is a communication module for supporting mobile communication service of the mobile terminal 100. The RF unit 110 establishes a communication channel with the mobile communication system. For this purpose, the RF unit 110 may include an RF transmitter for up-converting and amplifying the transmission signal and an RF receiver for low noise amplifying and down-converting the received signal.

Figure 2:
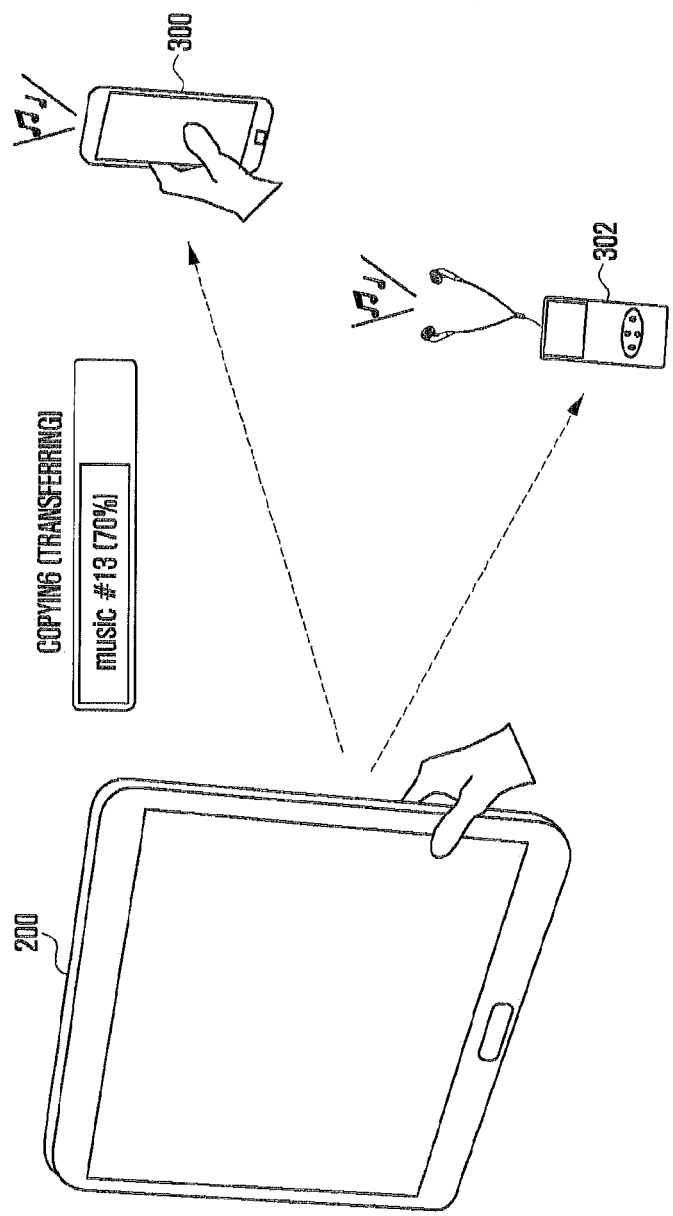
FIG. 2 is a diagram illustrating a situation of pre-playing a file transferred from the first device to the second device according to an embodiment of the present invention.

According to an embodiment of the present invention, the RF unit 110 is capable of transferring data from the first device 200 to the second devices 300, 302 as shown in FIG. 2. For example, the first device 200 may store files including multimedia data. If sample playback data for pre-playing a part of the multimedia data exists, the RF unit 100 may transfer the sample playback data from the first device 200 to the second devices 300, 302.

The RF unit 110 can transmit the file or the multimedia data from the first device 200 to the second devices 300, 302. The RF unit 110 may transmit at least one of the file, multimedia data, and the sample playback data from the second devices 300, 302 to the first device 200.

The information transfer method between the electronic devices may include 1:N device information transfer method for transferring information from one to multiple devices as well as 1:1 device information transfer method. Also, N:1 information transfer method can be included.

The physical connection between the devices may be established through Universal Serial Bus (USB) cable. The term 'transfer' may means transferring from one electronic device to another electronic device and copying inside one electronic device. For example, the transfer may be performed from an external memory attached to the electronic device to the internal memory in the meaning of copy and/or transfer.

The input unit 120 is provided a plurality of input keys and function keys to receive alphanumerical information and configuration of various functions. The function keys may be implemented in the form of navigation keys, side keys, and shortcut keys for executing specific functions. The input unit 120 generates key signals associated with the user setting and function control of the mobile terminal 100 to the control unit (or a processor) 160.

The audio processing unit 130 may include a speaker (SPK) for outputting audio signal from the control unit 160 and a microphone (MIC) for collecting audio signal in association with the activation of a specific application program. In the case that the RF unit 110 is activated, the audio processing unit 130 may output the audio signal received by the RF unit 110.

According to an embodiment of the present invention, the audio processing unit 130 can play the sample playback data of the multimedia data in the course of transmitting the file from the first device 200 to the second devices 300, 302. The sample playback data may be played by at least one of the first device 200 and the second devices 300, 302.

In some embodiments, the audio processing unit can be incorporated into a processor, a control unit or a controller. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, other electronic units designed to perform the functions described herein, or a selective combination thereof. The controllers can comprise any conventional control means such as relay technology, ASICs, FPGA, programmable micro-controllers and micro-processors.

Figure 3:
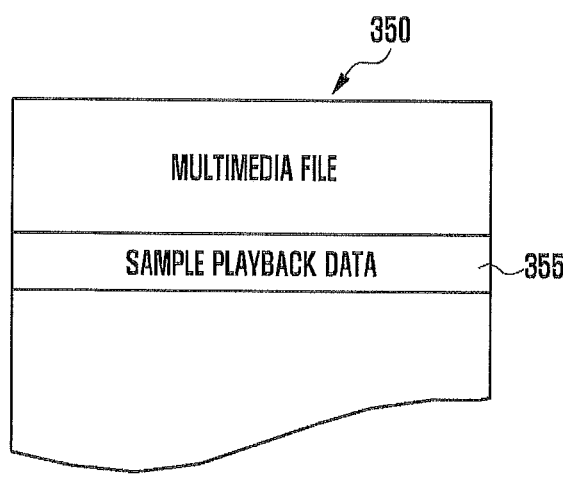
FIG. 3 is a diagram illustrating a structure of the sample playback data of the multimedia data according to an embodiment of the present invention.
Figure 4:
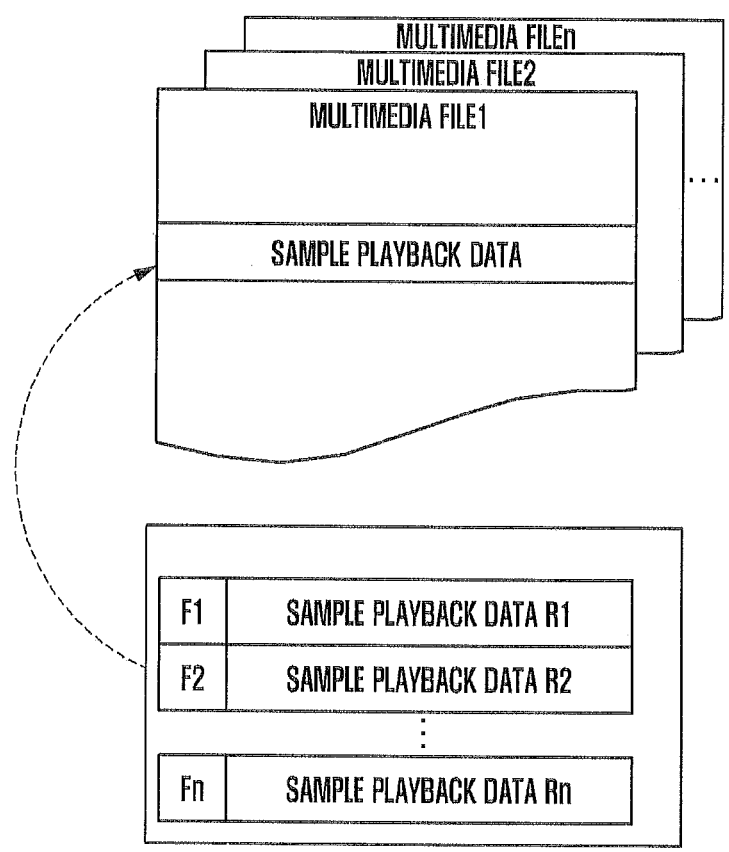
FIG. 4 is a diagram illustrating a plurality of the multimedia data according to an embodiment of the present invention.

FIG. 3 is a diagram illustrating a structure of the multimedia data 350 according to an embodiment of the present invention. FIG. 4 is a diagram illustrating a plurality of the multimedia data according to an embodiment of the present invention;

The term of multimedia data denotes a file integrating audio and video data and text as shown in FIGS. 3 and 4. The multimedia data may include the sample playback data that can be played in advance. If no sample playback data is included in the multimedia data, it is impossible to perform pre-playback.

The sample playback data can be an audio file. The audio file is a part of the audio stream with which the user can identify the music file. This part corresponds to the chorus, high-pitched part, or repeating pattern. In the case of a song with a length of 5 minutes, the user may identify the music by listening the music for 4~5 seconds.

The playback time of the sample playback data can be changed depending on the type, size, and extension of the file to be transferred. For example, the sample playback data playback time can be elongated for a large file. The control unit 160 may estimate the multimedia data transfer rate and time and determine the sample playback time based on the estimated transfer rate and time.

If the transfer rate changes due to the surrounding environment, the sample playback time can be changed. The user may fix the length of the sample playback time. It is also possible to decrease the sample playback time proportionally as the transfer rate increases.

The sample playback data can include the data capable of playing an identifier corresponding to the multimedia data and a predetermined part of the multimedia data. Here, the identifier can be an image capable of identifying the multimedia data. The identifier also can denote the file extension such as avi, mid, mp3, mpg, mpeg, wma, asf, txt, and aiff.

The sample playback data can include audio data, image data, and video data. The audio processing unit 130 can output voice and sound in playing the audio and video data. The image data is displayed on the touchscreen 140.

The touchscreen 140 displays information input by and presented to the user as well as various menus. That is the touchscreen 140 displays various screens associated with the operation of the mobile terminal 100 such as standby screen, menu screen, message composition screen, and call processing screen. The touchscreen 140 can adopt one of Liquid Crystal Display (LCD) and Organic Light Emitting Diodes (OLED) and act as a part of the input means. The mobile terminal 100 can provide various menu screens operation with the interaction on the touchscreen 140.

According to an embodiment of the present invention, the touchscreen 140 may display the sample playback data. As described above, the identifier of the sample playback data may be display along with the sample playback data. The touchscreen 140 can display the state screen showing the file transfer or storing state. The touchscreen 140 can display an image corresponding multimedia and related advertisement.

When a control command for executing a function is issued by the control unit 160 in the state of transmitting the file, the touchscreen 140 can display the function execution screen.

The touchscreen 140 also can display the identifier corresponding to the multimedia data of the sample playback data. The touchscreen 140 can display the identifier in the form of a file extension such as avi and mid as described. For a music file, the touchscreen 140 can display the genre, title of the song, current playback position, and total running time of the song.

The storage unit 150 can store application programs for playing various files, a key map and a menu map for operating the touchscreen 140 as well as the application programs associated with the functions according to an embodiment of the present invention. The key and menu maps can be implemented in various forms.

The key map can be any of a 3*4 key map, a QWERTY key map, and a control key map for control the operation of the currently running application program. The menu map can be a control key map for controlling the operation of the currently running application program. The menu map can be the menu map for controlling the operation of the currently activated application program or the menu map presenting various menu items provided by the mobile terminal 100. The storage unit 150 may include a program region and a data region.

The program region can store the Operating System (OS) for booting the mobile terminal and operating aforementioned components and application programs for processing various files, e.g. a telephony function execution application program, a web browser for access to an Internet server, an MP3 application program for playing music files, an image display application program for displaying pictures, and video playback application program.

The data region is of storing data occurring in the course of the mobile terminal 100 and can store phonebook, at least one widget icons, and various types of contents. In the case of the touchscreen-equipped mobile terminal, the data region also can store the user data input through the touchscreen 140.

According to an embodiment of the present invention, the data region can store at least one of the files transmitted by the device, multimedia data, and sample playback data. The stored files are managed under the control of the control unit 160.

The control unit 160 controls power supply to initialize the individual components and, if the initialization completes, controls the operations of the components. For example, the control unit 160 can be a processor for providing a function corresponding to an input.

According to an embodiment of the present invention, the control unit 160 receives a signal input by the user to select at least one file. The file selection can be done by receiving the signal input made through the touchscreen 140. The file selection also can be done by receiving a file transmitted by an external device by means of the RF unit (or transceiver) 110. The control unit 160 can check the file received by the RF unit 110.

It is possible to select the file to be copy and/or transmitted from a folder list or a corresponding list. The file selection can be made to select any of all the types of files including compressed file and encoded file as well as multimedia data file. The control unit 160 can determine whether the mobile terminal is operating in the sample playback mode. If the mobile terminal is not in the sample playback mode, the control unit 160 performs a normal copy and/or transmission mode. If the mobile terminal is in the sample playback mode, the control unit 160 performs a copy and/or transmission of the sample playback data.

The control unit 160 checks whether the received file includes multimedia data. The multimedia data can be identified by the extensions of the multimedia data (e.g., avi, mid, mpe, mpg, ram, way, and wma). If the file includes multimedia data, the control unit 160 determines whether the multimedia data includes the sample playback data as a part thereof.

If the multimedia data includes the sample playback data, the control unit 160 sends the RF unit 110 a command instructing a transmission of the playback data. If no sample playback data is included in the multimedia data, the control unit 160 generates the sample playback data. The control unit 160 can generate the sample playback data with an information field and the representative data of the original file.

The information field can include a Uniform Resource Identifier (URI) as the file identification information. The representative data can be the one which, when it is played, the user is likely to identify the corresponding original file.

The sample playback data can be provided in the format with a high compression rate or loss rate. The sample playback data can be encoded into one type of format even when the files having different file extensions are mixed.

The sample playback data can be generated so as to be stored at different time points for avoiding overhead or for different purposes.

The control unit 160 can store the sample playback data without erasing from the first device 200. If the file has been copied and/or transmitted once at least, the corresponding sample playback data of the file is generated naturally in receipt of the request for the file afterward.

The control unit 160 can estimate the transfer rate and time, based on the size of the file and extract the sample payback data with an appropriate length for the estimation result.

The control unit 160 can receive a request to transmit a file including at least one multimedia file to an external device via the radio frequency unit. The control unit 160 can identify the file includes the sample playback data for playing a predetermined part. The control unit 160 can transmit the identified sample playback data via the radio frequency unit The control unit 160 can generate sample playback data if the multimedia data includes no sample playback data. The control unit 160 can control the radio frequency unit to transmit the generated sample playback data.

The control unit 160 can receive a sample playback data that is a part of the multimedia data of a file via the radio frequency unit. The control unit 160 can play the sample playback data of the multimedia data while receiving the file from the external device.

The control unit 160 can receive a sample playback data that receive a sample playback data that is a part of the multimedia data of a file via the radio frequency unit. The control unit 160 can play the sample playback data of the multimedia data while receiving the file from the external device.

The vibration unit 170 produces various vibrations under the control of the control unit 160. In order to accomplish this, the vibration unit 170 can include at least one vibration motor. The vibration unit 170 generates vibration in receipt of an incoming call in the mute/vibration mode or an alarm time arrives.

Figure 5:
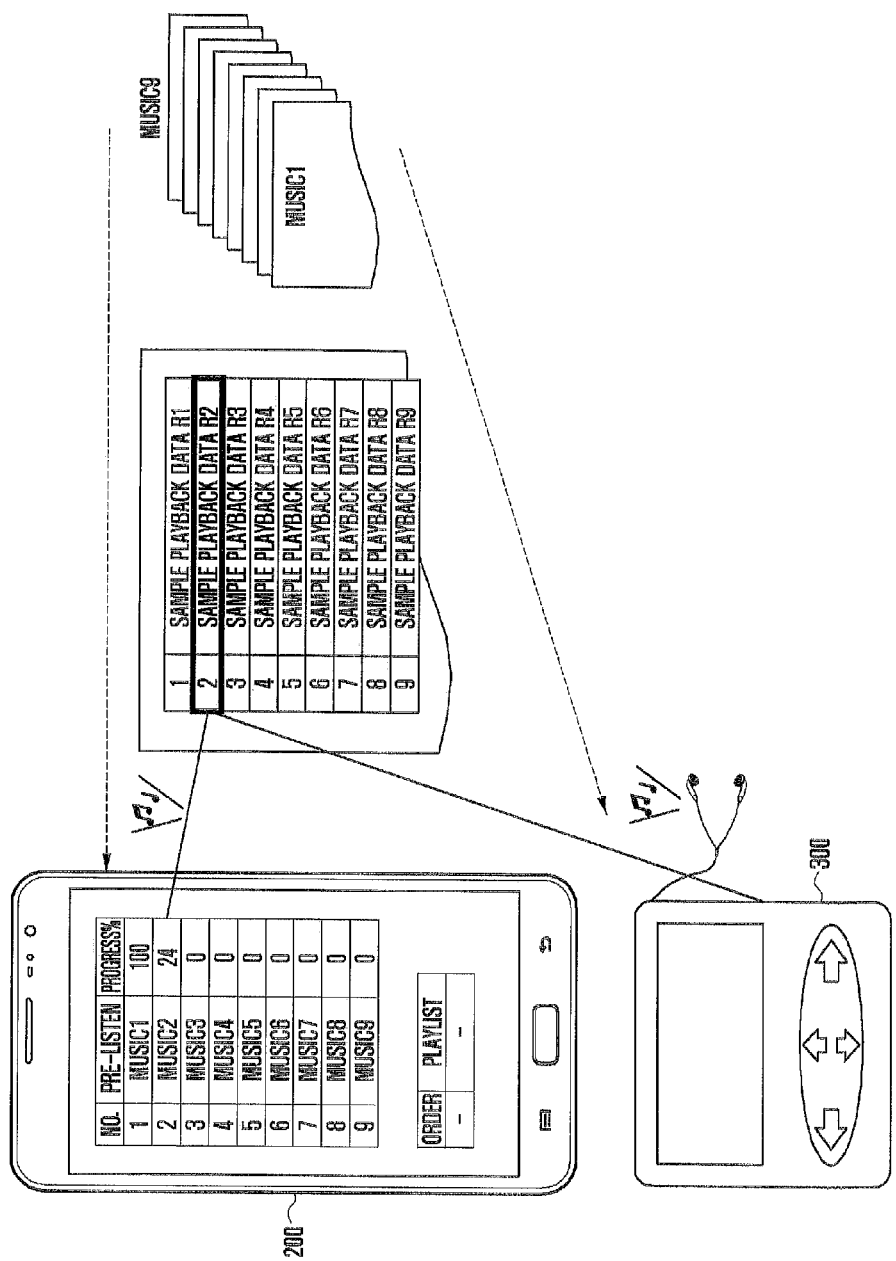
FIG. 5 is a diagram illustrating a method of transmitting the sample playback data from the first device to the second device according to an embodiment of the present invention.

FIG. 5 is a diagram illustrating a method of transmitting the sample playback data from the first device to the second device according to an embodiment of the present invention. The audio processing unit 130 of the second device 300 plays the sample playback data of, for example, the music 2 while the RF unit 110 of the first device 200 transfers the music 2.

Figure 6:
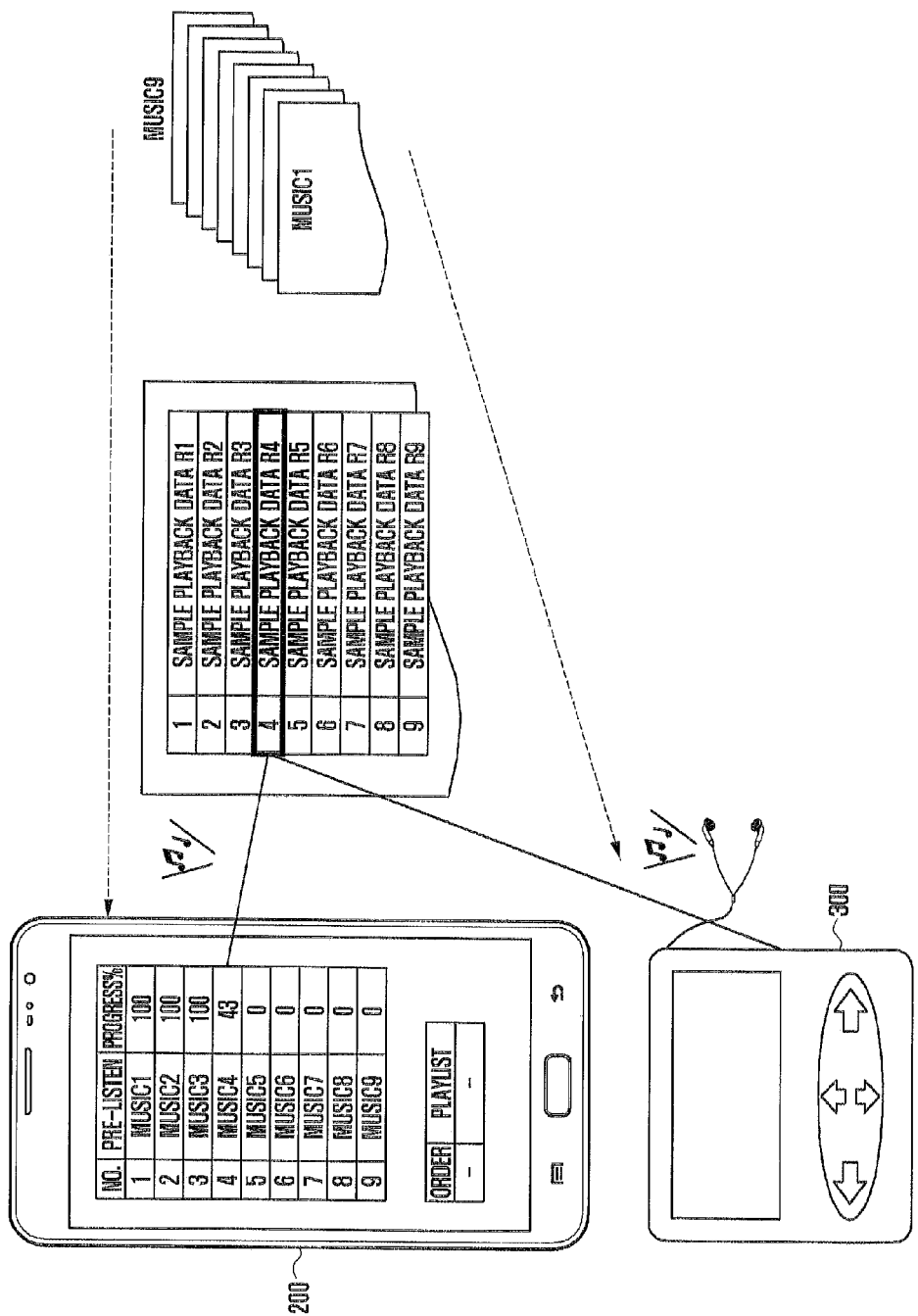
FIG. 6 is a diagram illustrating a method of transmitting the sample playback data from the first device to the second device according to another embodiment of the present invention.

FIG. 6 is a diagram illustrating a method of transmitting the sample playback data from the first device to the second device according to another embodiment of the present invention. While the first device 200 is transferring, for example, the music 4 to the second device 300 after completing the transmission of the music 2 and music 3, the second device 300 plays the sample playback data of the music 4.

FIGS. 5 and 6 are directed to the method of playing the sample playback data of the file in adaptation to the progress of the file transfer. However, the present invention is not limited to playing the sample playback data of the file being transferred but, when a normal file (which is not multimedia data) is included in the files being transmitted, the synchronization can vary.

Figure 7:
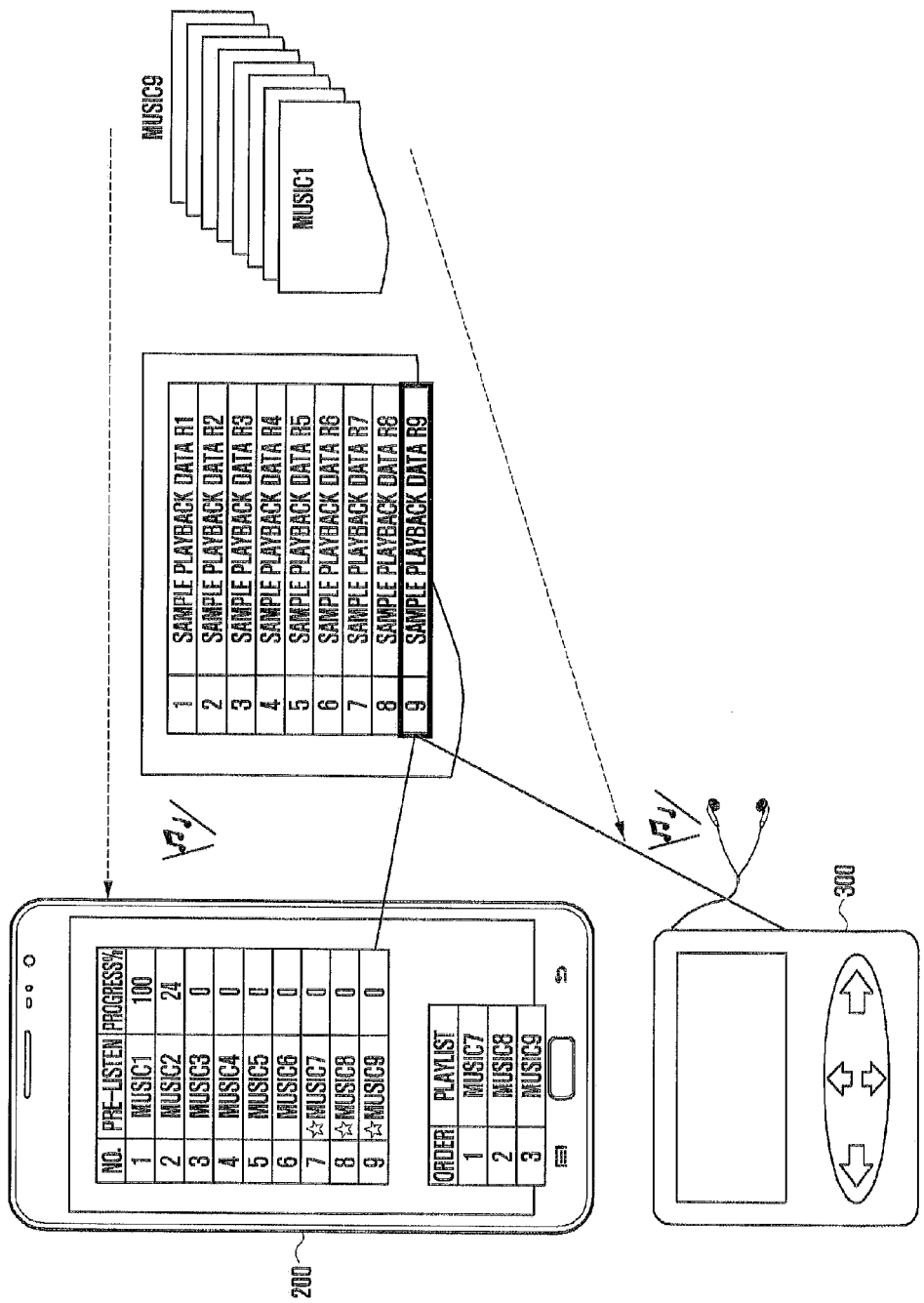
FIG. 7 is a diagram illustrating a method of editing a playlist in transmitting the sample playback data from the first device to the second device according to an embodiment of the present invention.

FIG. 7 is a diagram illustrating a method of editing a playlist in transmitting the sample playback data from the first device to the second device according to an embodiment of the present invention. The user of the second device 300 can listen to each sample playback data of, for example, the music 7, music 8, and music 9 and then registers the music files with favorites or playlist. The user can perform the registration using the touchscreen 140. The favorites can be marked with stars as shown in FIG. 7.

Figure 8:
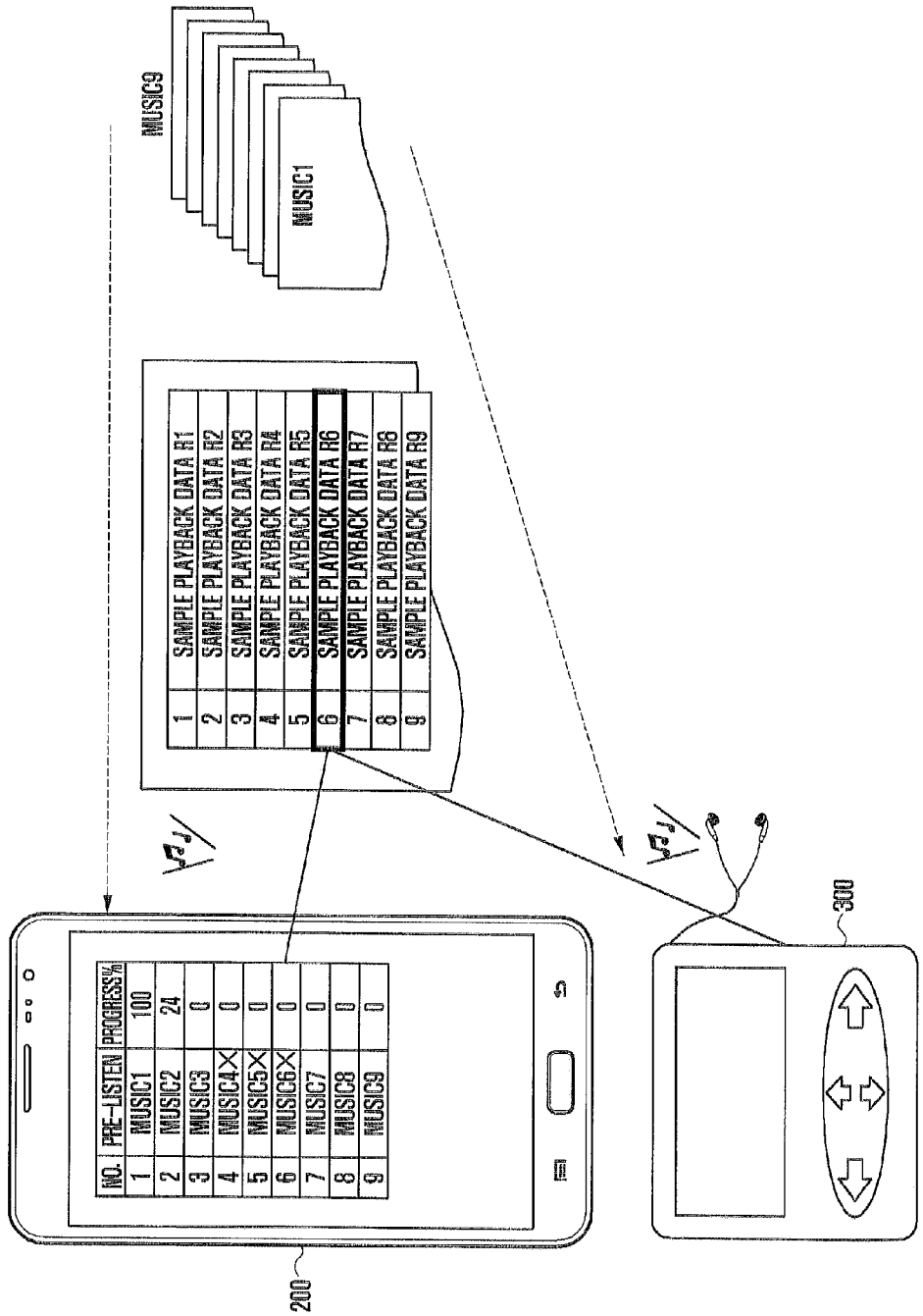
FIG. 8 is a diagram illustrating a method of transmitting the sample playback data from the first device to the second device according to another embodiment of the present invention.

FIG. 8 is a diagram illustrating a method of transmitting the sample playback data from the first device to the second device according to another embodiment of the present invention. After listening to each sample playback data of, for example, the music 4, music 5, and music 6, the user can command to skip or delete the corresponding file. The files to be deleted and edited can be marked with the symbol "X."

In the course of transferring the file, the second device 300 can perform at least one of add, delete, edit, save, copy, and receiving-stop operations on a predetermined list.

Figure 9:
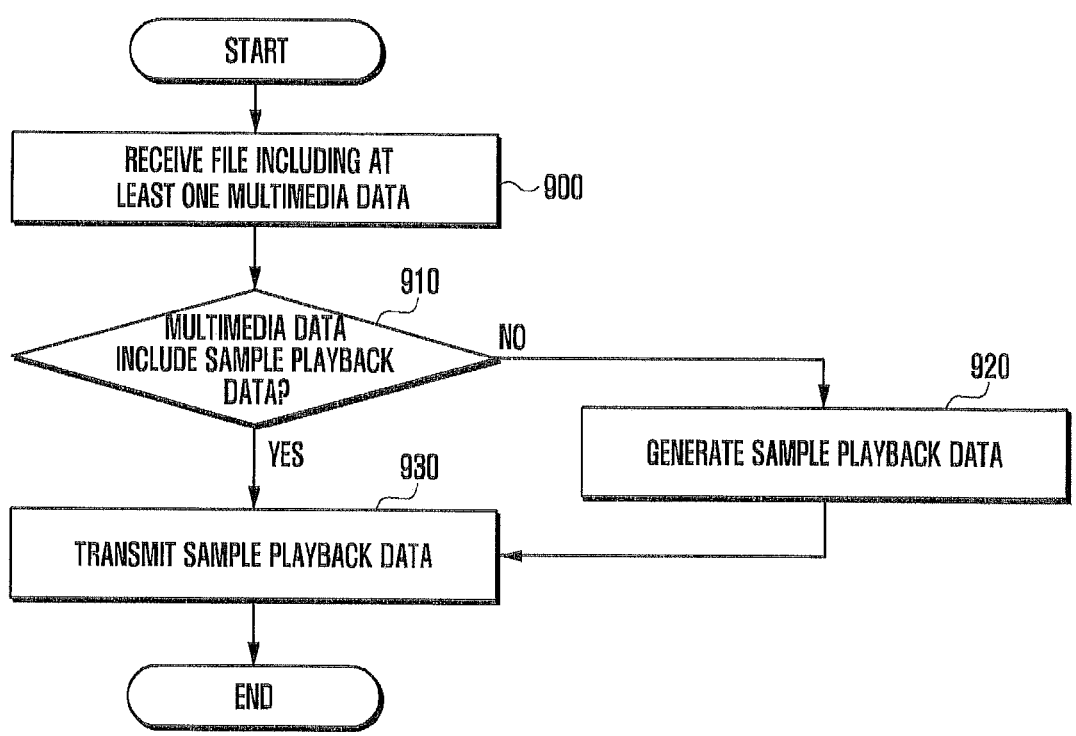
FIG. 9 is a flowchart illustrating a pre-playback operation in a mobile terminal according to an embodiment of the present invention.

FIG. 9 is a flowchart illustrating a pre-playback operation of a mobile terminal according to an embodiment of the present invention.

The RF unit 110 receives at least one multimedia data at step 900. The control unit 160 determines whether the multimedia data includes sample playback data at step 910. If no sample playback data is included, the control unit 160 generates sample playback data at step 920. The RF unit 110 transmits the sample playback data at step 930. Transmitting the sample playback data can include storing the sample playback data as well as transmitting the sample playback data to an external electronic device.

Figure 10:
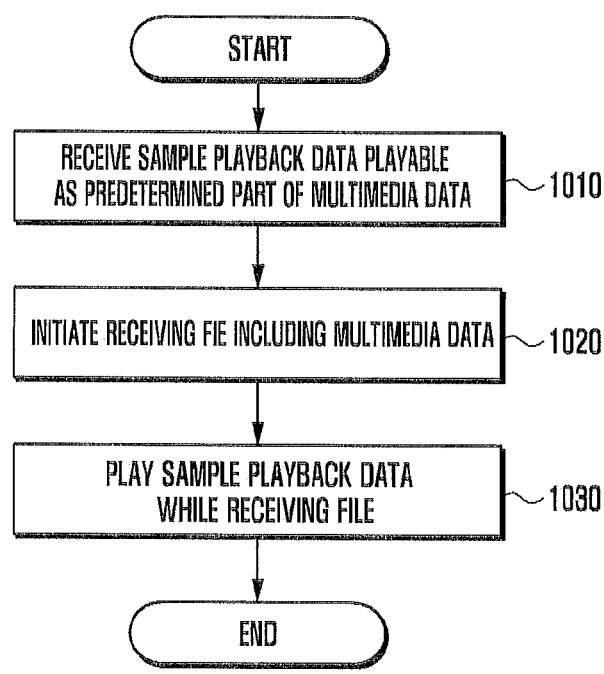
FIG. 10 is a flowchart illustrating a pre-playing operation in a mobile terminal according to another embodiment of the present invention.

FIG. 10 is a flowchart illustrating a pre-playing method of a mobile terminal according to another embodiment of the present invention. The RF unit 110 receives the sample playback data as a predetermined part of the multimedia data at step 1010. In some embodiments, the sample playback data can be the beginning portion of the multimedia file. The RF unit 110 starts receiving the file including multimedia data at step 1020. The audio processing unit 130 plays the sample playback data while receiving the file at step 1030.

Figure 11A:
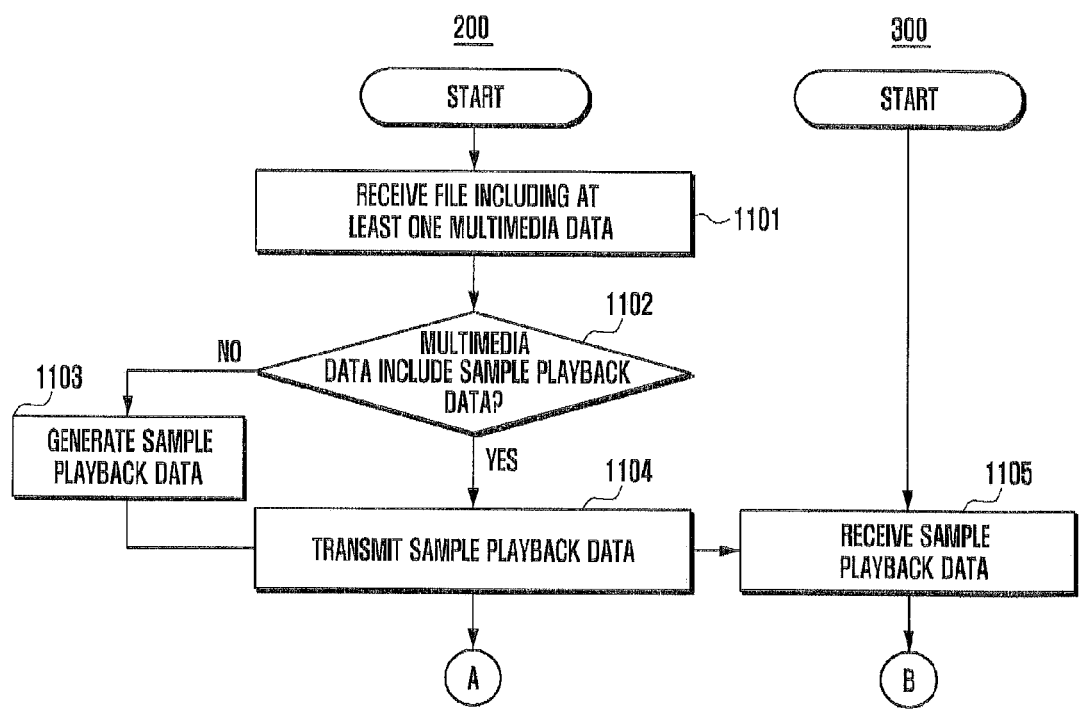
FIGS. 11A and 11B are flowcharts illustrating pre-playback operations in a mobile terminal according to another embodiment of the present invention.
Figure 11B:
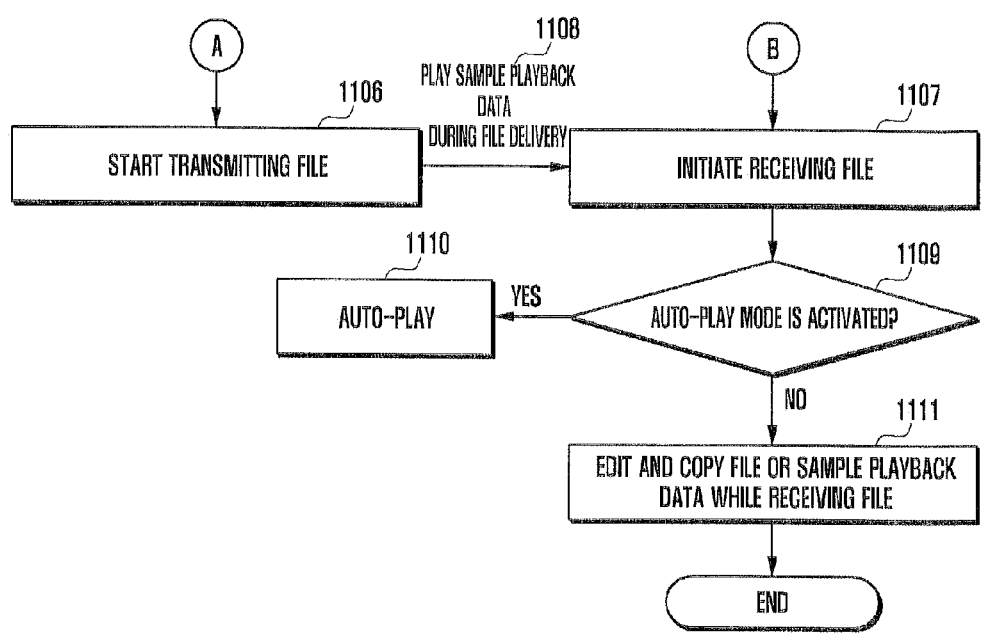

FIGS. 11A and 11B are a flowchart illustrating a pre-playback method of a mobile terminal according to another embodiment of the present invention.

The RF unit 110 of the first device 200 receives a file including at least on multimedia data at step 1101. The control unit 160 of the first device 200 determines whether the received multimedia data includes the sample playback data at step 1103 and, if no sample playback data is included, generates sample playback data at step 1104. The RF unit 110 of the first device 200 transmits the sample playback data at step 1104.

The RF unit 110 of the second device 300 receives the sample playback data at step 1105. The first device 200 starts transmitting the file at step 1106. The RF unit 110 of the second device starts receiving the file at step 1107. The audio processing unit 130 of at least one of the first and second devices 200 and 300 plays the sample playback data in the course of transferring the file at step 1108.

The control unit 160 of the second device 300 determines whether the sample playback data auto-play mode is activated at step 1109. If the auto-play mode is activated, the audio processing unit 130 of the second device 300 plays the sample playback data in a predetermined mode automatically at step 1110. The predetermined mode can be a sequential playback mode or a random playback mode. The control unit 160 of the second device 300 can receive a signal input for at least one of adding, deleting, editing, saving, coping, and stopping receipt of the file or sample playback data in the course of receiving the file at step 1111.

Figure 12:
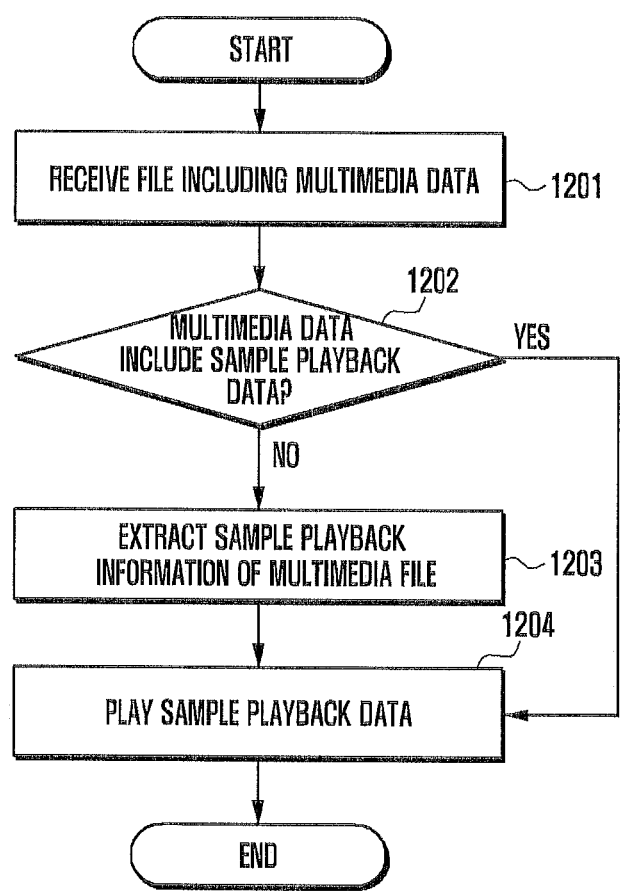
FIG. 12 is a flowchart illustrating a pre-playback method of the mobile terminal according to another embodiment of the present invention.

FIG. 12 is a flowchart illustrating a pre-playback method of the mobile terminal according to another embodiment of the present invention.

The RF unit 110 receives the file including multimedia data at step 1201. The control unit 160 determines whether the multimedia data includes sample playback data at step 1202. If no sample playback data is included, the control unit 160 extracts sample playback data from the multimedia file at step 1203. The audio processing unit 130 plays the sample playback data at step 1204.

As described above, the file playback method and apparatus of the present invention is advantageous in that the user is capable of doing other activity while checking the multimedia files being transferred by ears other than eyes.

Also, the file playback method and apparatus of the present invention is advantageous in that the user participated in the session even with an electronic device without a display or with but simplified can check the multimedia file being transferred.

Furthermore, the file playback method and apparatus of the present invention is advantageous in terms of improving the user convenience and device utilization by making it possible for the user to edit, save, and delete the storing position of the multimedia file to be received and the playback list in the course of receiving the multimedia file.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for playing multimedia data in an electronic device, the method comprising:
    receiving a request for transmitting a file including a plurality of multimedia data to a second device;
    identifying a plurality of sample playback data of the file, wherein each of the plurality of sample playback data is respectively corresponding to a portion of each of the plurality of multimedia data;
    transmitting the plurality of sample playback data of the file to the second device;
    transmitting remaining data of the file to the second device after transmitting of the plurality of sample playback data is completed, the remaining data including the plurality of multimedia data; and
    playing, in response to a user input, the plurality of sample playback data while the remaining data of the file is being transmitted.

2. The method of claim 1, further comprising:
    if the file includes no sample playback data, generating each of the plurality of sample playback data by extracting a part of each of the plurality of multimedia data; and
    transmitting the plurality of generated sample playback data to the second device.

3. The method of claim 1, further comprising:
    displaying the plurality of sample playback data on a screen of the electronic device.

4. The method of claim 1, wherein the plurality of multimedia data comprises at least one of audio data, image data, and video data.

5. The method of claim 1, wherein each of the plurality of the sample playback data comprises an identifier indicating a format of the multimedia data and playable multimedia data.

6. The method of claim 5, wherein a playback length of each of the plurality of sample playback data is determined based on a transmission time and a transmission rate of the multimedia data.

7. The method of claim 2, further comprising storing the generated sample playback data in a memory of the electronic device.

8. A method for playing multimedia in an electronic device, the method comprising:
    transmitting a request for receiving a file including a plurality of multimedia data to an external device;
    receiving a plurality of sample playback data of the file from the external device, wherein each of the plurality of sample playback data is respectively corresponding to a portion of each of the plurality of multimedia data;
    receiving remaining data of the file to the external device after transmitting of the plurality of sample playback data is completed, the remaining data including the plurality of multimedia data; and
    playing, in response to a user input, the plurality of sample playback data while the remaining data of the file is being received.

9. The method of claim 8, further comprising if the plurality of sample playback data is configured to be played automatically, playing the plurality of sample playback data automatically.

10. The method of claim 8, further comprising:
    receiving an input for executing at least one of adding, deleting, editing, saving, and copying the file or the sample playback data on a list while receiving the file; and
    performing a function corresponding to the received input.

11. An electronic device comprising:
    a memory configured to have instructions stored therein;
    a transceiver configured to transmit or receive a signal;
    an audio processing unit configured to play a plurality of sample playback data; and
    a processor,
    wherein upon execution of the instructions, the process is configured to:
    receive a request to transmit a file including a plurality of multimedia data to an external device via the transceiver;
    identify a plurality of sample playback data of the file, wherein each of the plurality of sample playback data is respectively corresponding to a portion of each of the plurality of multimedia data;
    transmit the plurality of identified sample playback data of the file to the external device via the transceiver;

transmit remaining data of the file to the external device after transmitting of the plurality of sample playback data is completed, the remaining data including the plurality of multimedia data; and play, in response to a user input, the plurality of sample playback data while the remaining data of the file is being transmitted.

12. The electronic device of claim 11, wherein the processor is configured to:

generate each of the plurality of sample playback data by extracting a part of each of the plurality of multimedia data if the file includes no sample playback data; and control the transceiver to transmit the plurality of generated sample playback data.

13. The electronic device of claim 11, further comprising:

a touchscreen configured to display the plurality of sample playback data.

14. The electronic device of claim 11, wherein the plurality of multimedia data comprises at least one of audio data, image data, and video data.

15. The electronic device of claim 11, wherein each of the plurality of sample playback data comprises an identifier indicating a format of the multimedia data and a part of the multimedia data.

16. The electronic device of claim 15, wherein a playback length of each of the plurality of sample playback data is determined based on a transmission time and a transmission rate of the multimedia data.

17. An electronic device comprising:

a memory configured to have instructions stored therein;

a transceiver configured to transmit or receive a signal;

an audio processing unit configured to play data; and a processor, wherein upon execution of the instructions, the processor is configured to:

control the transceiver to transmit a request a file including a plurality of multimedia data to an external device;

control the transceiver to receive a plurality of sample playback data from the external device, wherein the plurality of sample playback data is respectively corresponding to a portion of each of the plurality of multimedia;

control the transceiver to receive remaining data of the file from the external device after receiving of the plurality of sample playback data is completed, the remaining data including the plurality of multimedia data; and control the audio processing unit to play, in response to a user input, the plurality of sample playback data while the remaining data of the file is being received from the external device.

* * * * *